(12) United States Patent
Akahane et al.

(10) Patent No.: US 7,548,845 B2
(45) Date of Patent: Jun. 16, 2009

(54) APPARATUS, METHOD, AND PROGRAM PRODUCT FOR TRANSLATION AND METHOD OF PROVIDING TRANSLATION SUPPORT SERVICE

(75) Inventors: Eiju Akahane, Yokohama (JP); Yumi Ikeza, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 11/608,368

(22) Filed: Dec. 8, 2006

(65) Prior Publication Data

US 2007/0150259 A1 Jun. 28, 2007

(30) Foreign Application Priority Data

Dec. 8, 2005 (JP) ............................. 2005-355001

(51) Int. Cl.
G06F 17/28 (2006.01)
G06F 17/21 (2006.01)
(52) U.S. Cl. .................................. 704/7; 704/2; 704/10
(58) Field of Classification Search ...................... 704/7
See application file for complete search history.

(56) References Cited

U.S. PATENT DOCUMENTS

| | | | | |
|---|---|---|---|---|
| 5,469,354 A * | 11/1995 | Hatakeyama et al. | ........... | 707/3 |
| 5,523,946 A * | 6/1996 | Kaplan et al. | ................... | 704/2 |
| 5,724,593 A * | 3/1998 | Hargrave et al. | ................ | 704/7 |
| 7,072,826 B1 * | 7/2006 | Wakita | ........................... | 704/2 |
| 7,096,179 B2 * | 8/2006 | Zhu et al. | ...................... | 704/1 |

FOREIGN PATENT DOCUMENTS

| | | | |
|---|---|---|---|
| JP | 10-293765 | A1 | 11/1998 |
| JP | 11-066086 | A1 | 3/1999 |
| JP | 2000-090087 | | 3/2000 |
| JP | 200090087 | A1 | 3/2000 |
| JP | 2004090087 | A1 | 3/2000 |
| JP | 2004-220266 | | 5/2004 |
| JP | 2004220266 | A1 | 8/2004 |
| JP | 2004-326302 | A1 | 11/2004 |
| JP | 2004535617 | A1 | 11/2004 |

* cited by examiner

*Primary Examiner*—David R Hudspeth
*Assistant Examiner*—Justin W Rider
(74) *Attorney, Agent, or Firm*—Jerry W. Herndon; Shimokaji & Associates, P.C.

(57) ABSTRACT

An apparatus selects from among a plurality of translation records a translation record for use in translation of a newly received text. Each of the translation records stores with respect to past translation results at least one pair of a source-language text, being a divided part corresponding to a translation segment in the received text, and a target-language text corresponding to the source-language text. A first key generation unit generates an input key for each of the translation segments in the received text. A translation segment is encoded based on a predetermined conversion rule. An acquisition unit acquires a translation record key in which a source-language text is encoded based on the predetermined conversion rule. A key search unit determines whether a translation record key identical with each of the input keys is present or not. A first count unit counts a quantity of input keys that have translation record keys identical with each of the translation records. A determination unit determines a translation record for use in translating the received text on the basis of the count result for each segment.

3 Claims, 13 Drawing Sheets

APPARATUS, METHOD, AND PROGRAM PRODUCT FOR TRANSLATION AND METHOD OF PROVIDING TRANSLATION SUPPORT SERVICE

TECHNICAL FIELD

The present invention relates to an apparatus, a method, and a program product for translation and a method for providing translation support services. In particular, it relates to providing a translation support service that supports new translation by using a past translation result.

BACKGROUND ART

A machine translation system including an example database that stores and manages sentences in different languages so that sentences in one language are associated with sentences in the other language (Patent Document 1), an interpretation apparatus including a database that stores a question sentence in a first language and its translated question sentence in a second language as a pair (Patent Document 2), a method of creating a database associating words in a first language with words in a second language that are translation of each other (Patent Document 3) are all known. These techniques can reduce time and effort of a user required for translation.

[Patent Document 1] Japanese Unexamined Patent Application Publication No. 2004-220266

[Patent Document 2] Japanese Unexamined Patent Application Publication No. 2000-090087

[Patent Document 3] PCT Japanese Translation Patent Publication No. 2004-535617

Problems to be Solved by the Invention

For a translation apparatus that retrieves a past target-language text and uses it for new translation, if target-language texts stored in a database increase, a search target increases, and therefore, it takes a longer time to retrieve the best target-language text. Therefore, the translation apparatus is required to be capable of determining an appropriate past target-language text for use in new translation among an enormous number of target-language texts at high speed.

Accordingly, an object of the present invention is to provide an apparatus, a method, and a program product for translation and a method for providing a translation support service that can solve the problems. The object is achieved by any combination of features as specified in the independent claims. Dependent claims define further useful examples.

Means for Solving the Problems

To solve the problems, the present invention provides an apparatus for selecting from among a plurality of translation records a translation record for use in translation of a newly received text, a method for providing a translation support service using the apparatus, a program product for causing a computer to function as the apparatus. Each of the plurality of translation records stores with respect to past translation results at least one pair of a source-language text being a divided part corresponding to one of translation segments in the received text being units of translation of text and a target-language text corresponding to the source-language text. The apparatus includes a first key generation unit configured to, with respect to each of the translation segments in the received text, generate an input key in which a source-language text being a divided part corresponding to one of the translation segments is encoded based on a predetermined conversion rule, an acquisition unit configured to, in association with each of the plurality of translation records, acquire a translation record key in which a source-language text being a divided part corresponding to one of translation segments in the translation record is encoded based on the predetermined conversion rule, a key search unit configured to search whether a translation record key identical with each of the input keys is present or not, with respect to each of the plurality of translation records, a first count unit configured to count a quantity of input keys that have translation record keys identical therewith with respect to each of the plurality of translation records, and a determination unit configured to determine a translation record for use in translation of the received text on the basis of a count result with respect to each of the plurality of translation records.

The present invention also provides a method for selecting from among a plurality of translation records a translation record for use in translation of a newly received text. Each of the plurality of translation records stores with respect to past translation results at least one pair of a source-language text being a divided part corresponding to one of translation segments in the received text being units of translation of text and a target-language text corresponding to the source-language text for a past translation result. The apparatus includes a storing step of storing as one translation record of the plurality of translation records a pair of a source-language text and a target-language text obtained by translating the source-language text, with respect to each of the translation segments, a first key generation step of, with respect to each of the translation segments in the received text, generating an input key in which a source-language text being a divided part corresponding to one of the translation segments is encoded based on a predetermined conversion rule, an acquisition step of, in association with each of the plurality of translation records, acquiring a translation record key in which a source-language text being a divided part corresponding to one of translation segments in the translation record is encoded on the basis of the predetermined conversion rule, a key search step of searching whether a translation record key identical with each of the input keys is present or not, with respect to each of the plurality of translation records, a first count step of counting a quantity of input keys that have translation record keys identical therewith with respect to each of the plurality of translation records, a determination step of determining a translation record for use in translation of the received text on the basis of a count result with respect to each of the plurality of translation records, and a translating step of translating the received text by using the determined translation record.

According to the present invention, an appropriate past translation record utilizable in new translations can be determined at high speed.

BRIEF DESCRIPTION OF THE DRAWING

The present invention will be further illustrated with embodiments below. The embodiments do not limit the present invention relating to the claims.

DETAILED DESCRIPTION

Figure 1:
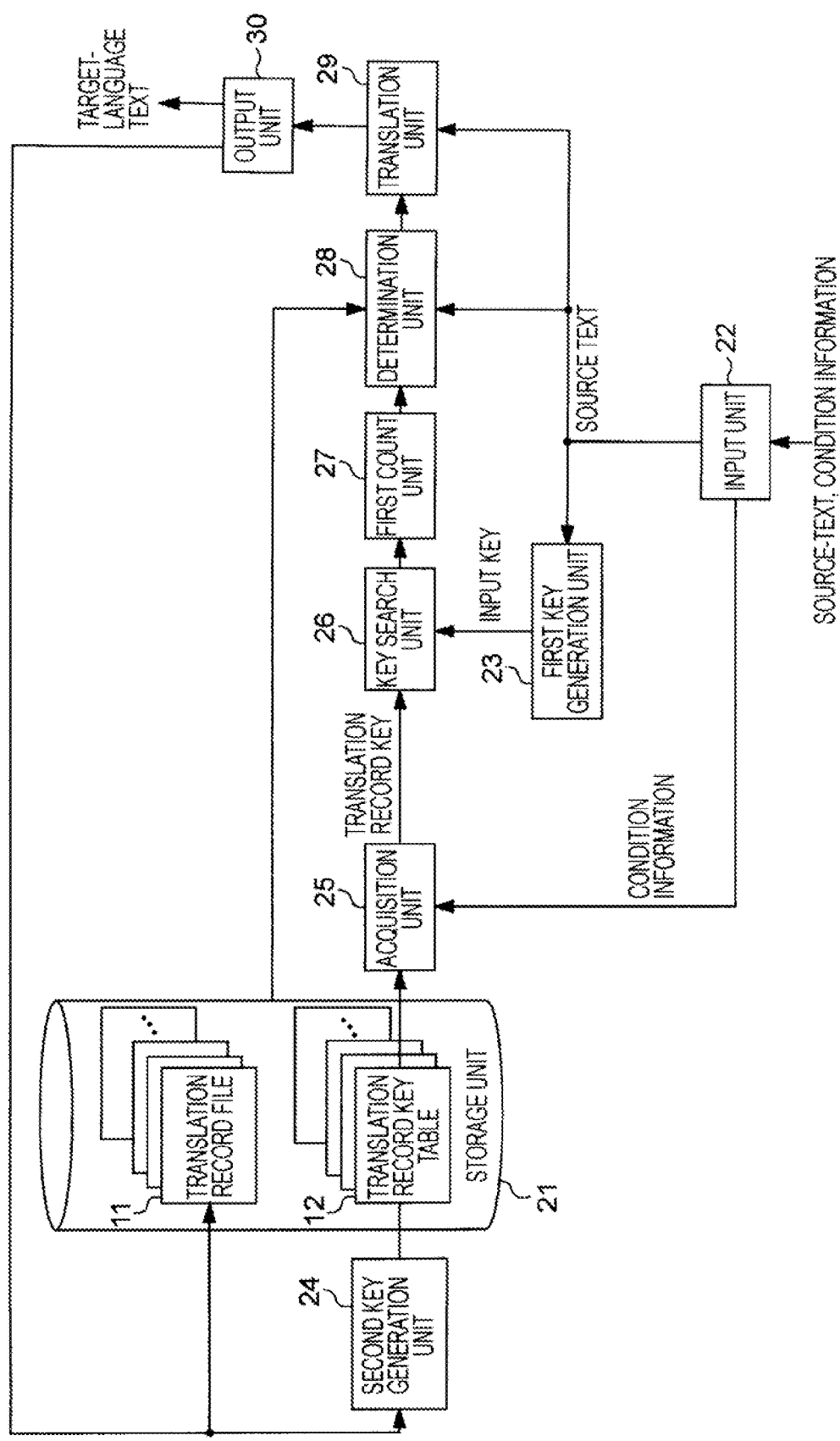
FIG. 1 illustrates the structure of a translation support apparatus 10 according to an embodiment.

FIG. 1 illustrates the structure of a translation support apparatus 10 according to an embodiment. The translation support apparatus 10 includes a storage unit 21, an input unit 22, a first key generation unit 23, a second key generation unit 24, an acquisition unit 25, a key search unit 26, a first count unit 27, a determination unit 28, a translation unit 29, and an output unit 30. The translation support apparatus 10 determines a translation record file 11 that is appropriate for use in translation of newly received text at high speed.

The translation record files 11 are an example of translation records according to the present invention, and each of the translation record files 11 stores at least one pair of a source-language text, being a divided part corresponding to one of translation segments being units of translation of text, and a target-language text corresponding to the source-language text with respect to a past translation result. The translation record files 11 may be replaced with a database that stores the same information as that contained in the translation record files 11 or a memory that stores the same information as that contained in the translation record files 11.

The translation record file 11 is generated for every translation project whose translation has been completed. The translation project is a unit which comprises a plurality of translation segments. One such exemplary unit is a product manual, being a translation target. Each of the plurality of translation record files 11 may further store meta information indicating a translation target and the like.

The storage unit 21 stores the translation record files 11 and translation record key tables 12 individually corresponding to the translation record files 11.

The input unit 22 receives a source text being text data of a source-language text being a translation target. The input unit 22 may receive condition information used for selecting the translation record file 11. In the case where the condition information is received, the input unit 22 receives condition information specifying attribute information contained in the meta information, for example, a translation target. The input unit 22 supplies the received source text to the first key generation unit 23, the determination unit 28, and the translation unit 29. The input unit 22 also supplies the received condition information to the acquisition unit 25.

The first key generation unit 23 generates an input key in which a source-language text, being a divided part corresponding to one of translation segments, is encoded based on a predetermined conversion rule with respect to each of the translation segments in the received source text.

In this case, one example of the predetermined conversion rule is a conversion rule in which, when two input keys generated from different translation segments are compared, the two input keys are typically different values, and, when two input keys are generated from the same translation segment, the two input keys are always the same value. According to such a conversion rule, by determining whether any two input keys are the same or different, it can be estimated whether the source-language texts are identical with each other for each of the translation segments being the sources of the respective input keys. As a result, the translation support apparatus 10 can determine whether source-language texts are identical with each other for each translation segment at high speed by generating an input key having a simple code structure using the predetermined conversion rule.

The first key generation unit 23 may further classify the generated input keys in accordance with a predetermined classification rule and generate type information indicating classification. The first key generation unit 23 supplies the input keys to the key search unit 26. In the case where the input keys are classified, the first key generation unit 23 also supplies the key search unit 26 with type information items in association with the input keys.

Prior to new translation, the second key generation unit 24 reads each of the translation record files 11 and generates a translation record key in which a source-language text, being a divided part corresponding to one of translation segments, is encoded based on the predetermined conversion rule with respect to each of the translation segments of the respective translation record files 11. At the time a translation is completed and the second key generation unit 24 stores a translation record file 11 in the storage unit 21; the second key generation unit 24 may generate a translation record key and store it together with the translation record file 11.

In this case, the predetermined conversion rule is identical with the rule for input key generation. Therefore, by determining whether an input key and a translation record key are the same or not, it can be estimated whether the source-language text, being a divided part corresponding to one of translation segments, is identical with the source text for each source translation segment.

The second key generation unit 24 generates the translation record key table 12 storing meta information and the translation record key corresponding to each translation segment in association with each of the plurality of translation record files 11. The second key generation unit 24 causes the storage unit 21 to store the generated translation record key tables 12.

The second key generation unit 24 may also classify the generated translation record keys in accordance with the same classification rule as that for the input keys. In the case where the translation record keys are classified, the second key generation unit 24 can sort the translation record keys by types and store the sorted translation record keys in the translation record key table 12, for example. At the same time, the second key generation unit 24 can add a pointer indicating the leading position for each type to the header of the translation record key table 12, for example.

In a new translation, the acquisition unit 25 acquires the translation record keys, which are encoded from the source-language text, being a divided part corresponding to one of the translation segments, on the basis of the predetermined conversion rule, in association with each of the plurality of translation record files 11 and supplies them to the key search unit 26. In this embodiment, for each of the translation record files 11, the acquisition unit 25 reads the translation record keys from the corresponding translation record key table 12 stored in the storage unit 21. The acquisition unit 25 may select the translation record key table 12 according to condition information and acquire the translation record keys from the selected translation record key table 12. For example, the acquisition unit 25 can refer to the meta information of each of the translation record key tables 12, select the translation record key table 12 having an attribute matching the condition information, and read the translation record keys from the selected translation record key table 12. Alternatively, the acquisition unit 25 may select all translation record key tables 12 and acquire the translation record keys from all of the selected translation record key tables 12.

The key search unit 26 searches whether a translation record key that matches each of the input keys is present or not, with respect to each of the plurality of translation record files 11. In this embodiment, the key search unit 26 searches the translation record keys read from the translation record key table 12 for each of the plurality of translation record files 11 to determine whether a translation record key that is identical with an input key is present or not. Therefore, the key search unit 26 can search whether a translation segment that is estimated to be identical with a translation segment contained in a source text is contained in the translation record files 11.

In the case where the input keys and the translation record keys have been classified, the key search unit 26 may search whether a translation record key that is identical with each of the input keys is present or not after the translation record keys are narrowed down depending on type information. This can facilitate the key search unit 26 to perform a search at higher speed.

In the case where the translation record key tables 12 have been sorted based on condition information, the key search unit 26 searches whether a translation record key that is identical with each of the input keys is present or not among the translation record keys read from a translation record key table 12 that has meta information matching condition information specified by a user. This can reduce the number of translation record files 11 to be searched for, thus allowing a search result to be obtained in a short period of time.

The first count unit 27 refers to the search result of the key search unit 26 and counts the quantity of input keys that have translation record keys identical therewith for each of the translation record files 11. In other words, the first count unit 27 outputs the count values indicating the respective quantities of translation segments estimated to be identical with the translation segments of the source text in association with the respective translation record files 11.

The determination unit 28 determines a translation record file 11 to be used for translation of the received source text on the basis of the count result of the first count unit 27 for each of the translation record files 11. In other words, the determination unit 28 determines a translation record file 11 that is appropriate for use in translation of the source text from the plurality of translation record files 11 stored in the storage unit 21 on the basis of the count values generated by the first count unit 27. Therefore, the determination unit 28 outputs a translation record file 11 that contains a source-language text having a translation segment identical with or similar to a translation segment in the source text. The determination unit 28 supplies the determined translation record file 11 to the translation unit 29.

The translation unit 29 performs support processing when the source text is translated by use of the translation record file 11 determined by the determination unit 28. One example is that the translation unit 29 displays the determined translation record file 11 together with the source text. Then, in response to a user's instruction, the translation unit 29 translates a translation segment relating to a source-language text identical with or similar to the source-language text stored in the translation record file 11 determined by the determination unit 28 among the translation segments in the source text by use of a target-language text corresponding to the source-language text stored in the translation record file 11.

The output unit 30 outputs the target-language text of the source text translated on the basis of support of the translation unit 29. The output unit 30 generates a new translation record file 11 on the basis of the source-language text and the target-language text of the source text and stores the new translation record file 11 in the storage unit 21. In this case, the second key generation unit 24 may generate a translation record key together with the generation of the translation record file 11 and store the translation record key in the storage unit 21.

Since the translation support apparatus 10 searches for a similar translation record file 11 by determining identity between texts by use of input keys and translation record keys being values converted from the texts, a translation record file 11 appropriate for use in translation of a source text can be determined at high speed.

Figure 2:
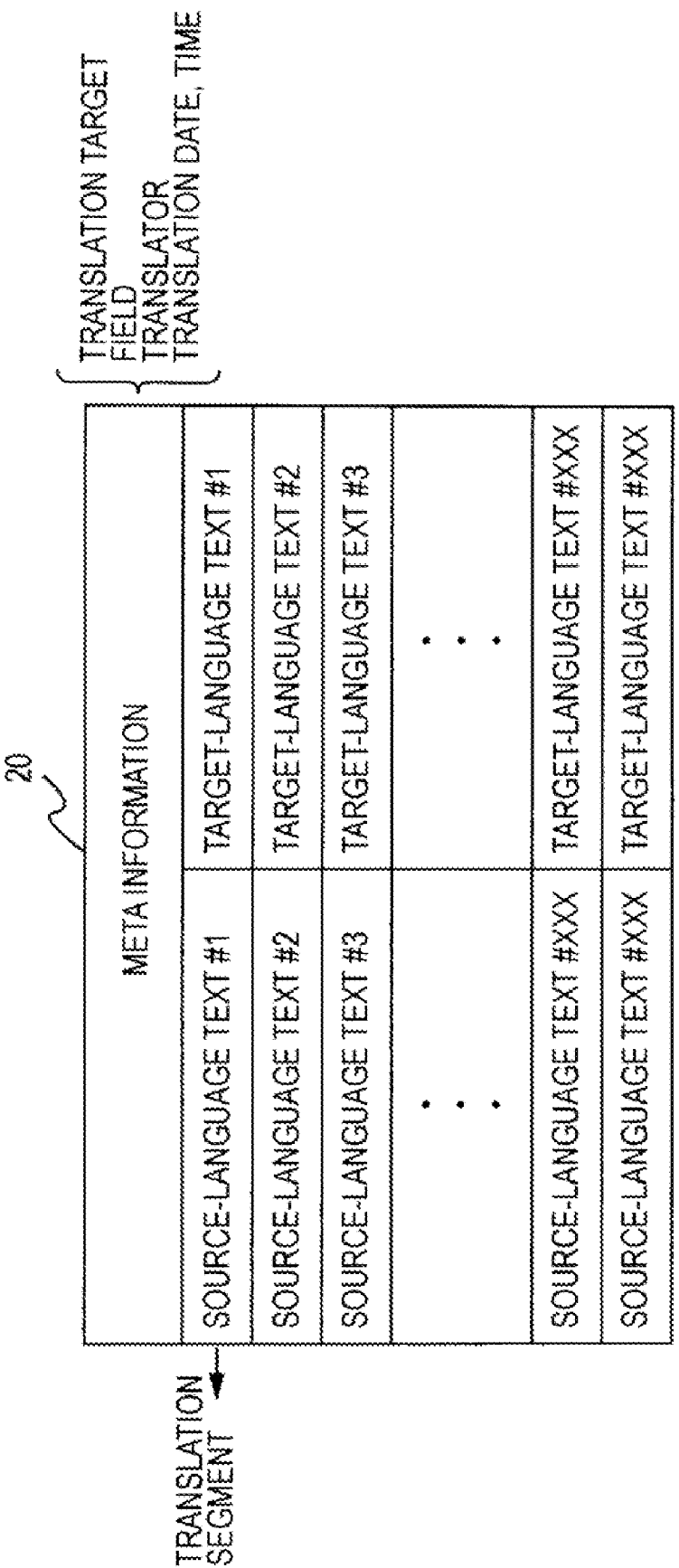
FIG. 2 illustrates an example of the structure of one of the translation record files 11 of FIG. 1.

FIG. 2 illustrates an example of the structure of one of the translation record files 11. A translation record file 11 includes meta information 20, a source-language text, being a divided part corresponding to one of translation segments being units of translation of text, and a target-language text. The meta information is information describing the attribute of the translation record file 11. For example, the attribute information can include at least one of a translation target, a field, a translator, a translation date, and a translation date and time stored in the translation record file 11. The translation record file 11 stores source-language text and target-language text as a pair in units of translation segments. For example, in the case where a single source-language text sentence corresponds to a single target-language text sentence, the single source-language text sentence and the single target-language text sentence constitute a single translation segment. In the case where two source-language text sentences correspond to a single target-language text sentence, the two source-language text sentences and the corresponding single target-language text sentence constitute a single translation segment, or alternatively, two translation segments are formed in which each of the two source-language text sentences corresponds to the same target-language text sentence.

Figure 3:
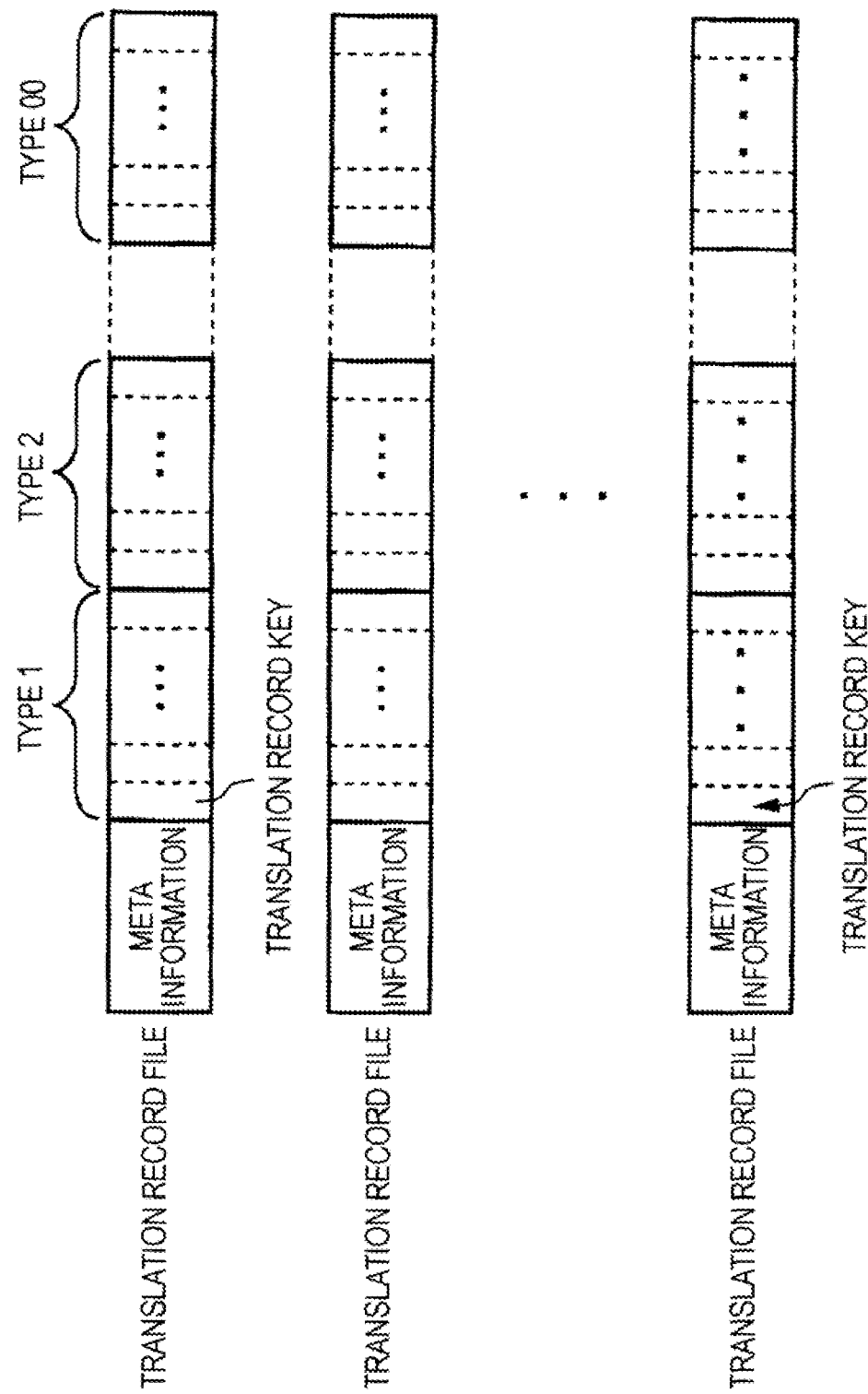
FIG. 3 illustrates an example of translation record key tables 12 of FIG. 1.

FIG. 3 illustrates an example of the translation record key tables 12. The second key generation unit 24 generates the translation record key table 12 for each of the translation record files 11. Each of the translation record key tables 12 includes meta information and a plurality of translation record keys. The translation record key table 12 may store the translation record keys sorted by types and store the position of the leading translation record key of each type in, for example, a header. This enables the key search unit 26 to search the translation record keys at high speed. The translation record key table 12 may store the translation record keys in association with respective type information items which indicate the types of the translation record keys.

Figure 4:
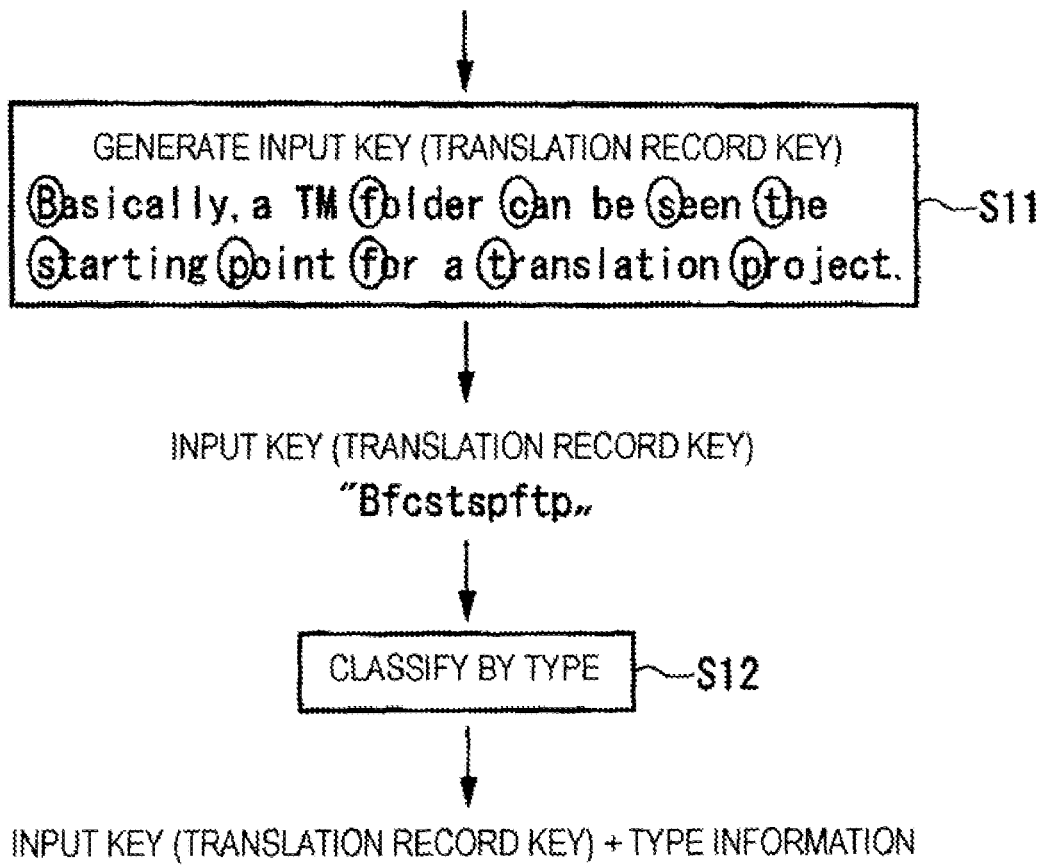
FIG. 4 illustrates an example of a flow diagram of a generation operation of an input key or a translation record key and a type classification operation in the first key generation unit 23 and the second key generation unit 24 of FIG. 1.

FIG. 4 illustrates an example of a flow diagram of a generation operation of an input key or a translation record key and a type classification operation in the first key generation unit 23 and the second key generation unit 24. First, the first key generation unit 23 and the second key generation unit 24 select a predetermined number of characters from the leading end of each word contained in a source-language text, being a divided part corresponding to one of translation segments in a received source text and a translation record file 11, respectively, and, on the basis of a character string generated by connecting the selected characters, generate an input key and a translation record key, respectively (S11). For example, the first key generation unit 23 and the second key generation unit 24 can extract one character at the leading end of a word that has a number of characters equal to or larger than a predetermined number (e.g., more than two characters) in the words contained in the source-language text being a divided part corresponding to one of translation segments and connect the extracted characters, thereby generating an input key and a translation record key, respectively.

The first key generation unit 23 and the second key generation unit 24 may select a first predetermined number of characters from the leading end of each word if the quantity of words contained in the source-language text being a divided part corresponding to one of translation segments is equal to or less than a predetermined number and, on the basis of a character string generated by connecting the selected characters, generate an input key and a translation record key, respectively; if the quantity of words contained in the source-language text being a divided part corresponding to one of translation segment exceeds the predetermined number, the first key generation unit 23 and the second key generation unit 24 may select a second predetermined number of characters, the second predetermined number being smaller than the first predetermined number, from the leading end of each word and, on the basis of a character string generated by connecting the selected characters, generate an input key and a translation record key, respectively. One example is that, if the quantity of words of a single translation segment is equal to or smaller than six, the first key generation unit 23 and the second key generation unit 24 can generate an input key and a translation record key, respectively, by connecting two characters extracted from the leading end of each word; if the quantity of words of the single translation segment exceeds six, the first key generation unit 23 and the second key generation unit 24 can generate an input key and a translation record key, respectively, by connecting one character at the leading end of each word. Therefore, even if the quantity of words in the source-language text being a divided part corresponding to one of translation segments is small, the recognition of the identity of the translation segment with other translation segments can be enhanced.

Instead of this, the first key generation unit 23 and the second key generation unit 24 may extract a predetermined number of characters from the trailing end of each word and generate an input key and a translation record key, respectively, in which the extracted characters are connected. Alternatively, the first key generation unit 23 and the second key generation unit 24 may extract a predetermined number of characters from a predetermined character position (e.g., the central portion of a word) and generate an input key and a translation record key, respectively, in which the extracted characters are connected.

The first key generation unit 23 and the second key generation unit 24 may generate an input key and a translation record key, respectively, without extracting a character of a word that has a number of characters smaller than a predetermined number from the words contained in a source-language text being a divided part corresponding to one of translation segments and without extracting a character of a word if the character to be extracted is a predetermined character (e.g., numeric character or symbol). If a character cannot be extracted for the above reason, the first key generation unit 23 and the second key generation unit 24 may assign all of a source-language text being a divided part corresponding to one of translation segments as an input key and a translation record key, respectively, because a translation segment containing the character is not normal.

Next, the first key generation unit 23 and the second key generation unit 24 classify by types the generated input keys and translation record keys, respectively (S12). For example, the first key generation unit 23 and the second key generation unit 24 can classify the input keys and translation record keys, respectively, by the number of characters and classify them depending on whether they contain a special character. When the classification is completed, the first key generation unit 23 and the second key generation unit 24 output the input keys and the translation record keys, respectively, and type information indicating the classification result.

Through steps S11 and S12, the first key generation unit 23 and the second key generation unit 24 can readily generate the input keys and the translation record keys for allowing identity or similarity of translation segments to be readily determined and can generate the type information for allowing a search to be performed at high speed.

Figure 5:
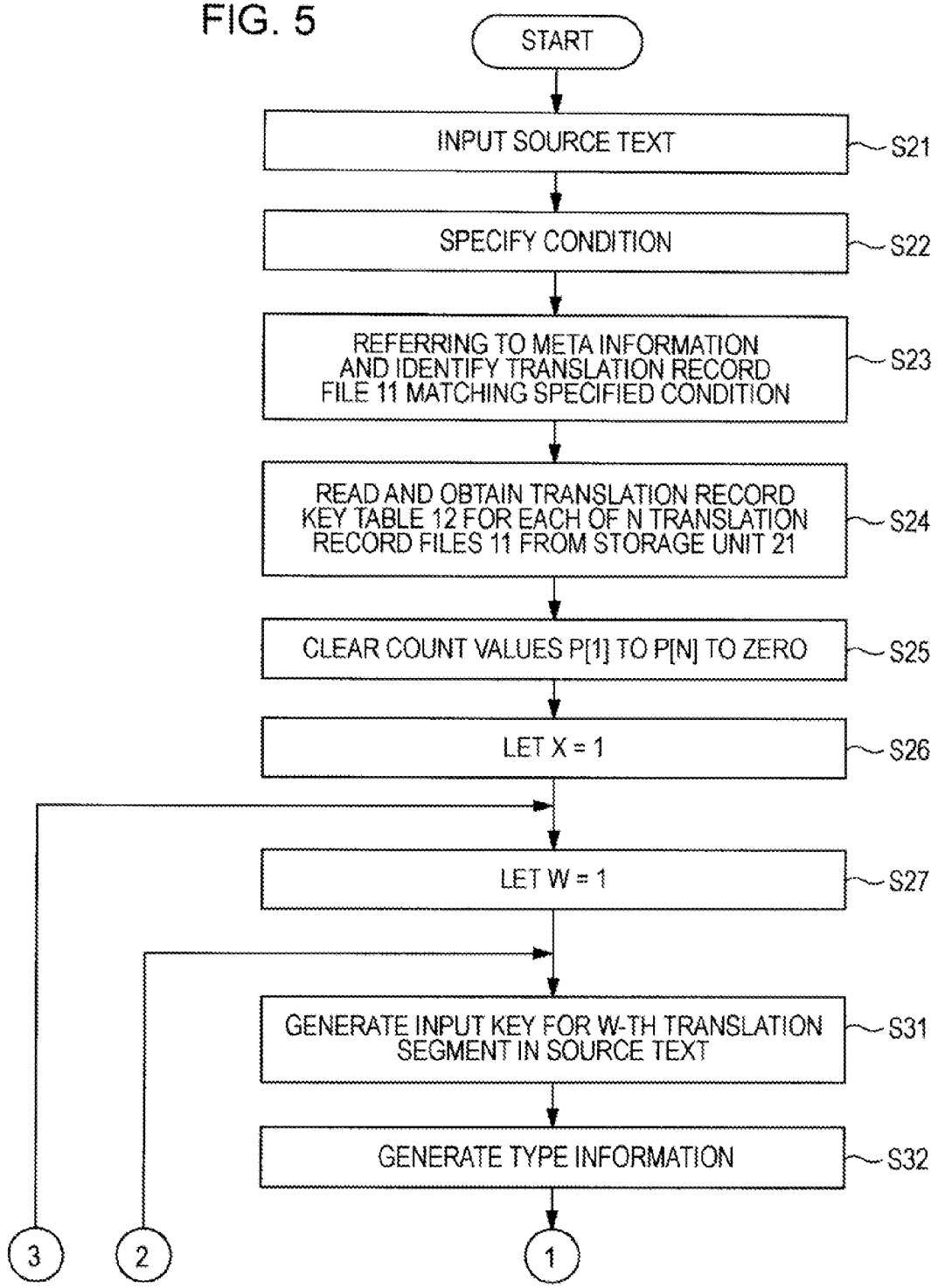
FIGS. 5 and 6 illustrate flow diagrams of an operation from an input of a source text to an output of a count value of translation segments in which the input key and the translation record key are identical.
Figure 6:
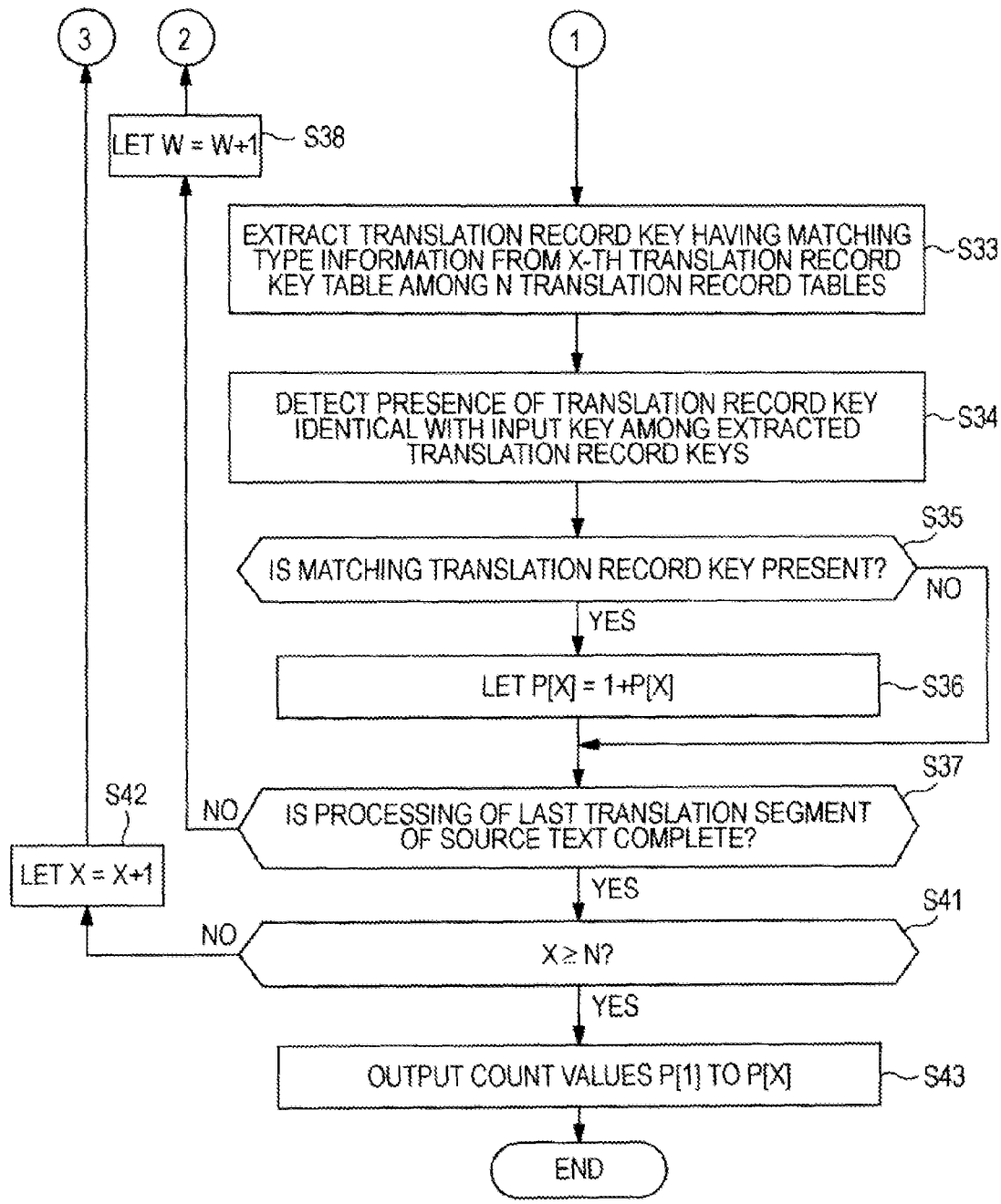

FIGS. 5 and 6 illustrate flow diagrams of an operation from an input of a source text to an output of a count value of translation segments in which the input key and the translation record key are identical with each other in the translation support apparatus 10 according to this embodiment.

The input unit 22 receives a source text (S21). The input unit 22 then receives a condition specified by a user as condition information (S22). The input unit 22 can receive, for example, condition information specifying attribute information contained in meta information (e.g., a translation target, field, translator, translation date, and translation date and time) as the condition information. The acquisition unit 25 refers to each of the plurality of translation record files 11 stored in the storage unit 21 and identifies a translation record file 11 that matches the condition specified by the user (S23). Instead of this, the acquisition unit 25 may refer to each of the translation record key tables 12 and identify a translation record key table 12. The acquisition unit 25 acquires the translation record key table 12 of each of a plurality of identified translation record files 11 (e.g., N files where N is an integer greater than 1) from the storage unit 21 (S24).

The first count unit 27 clears count values P[1] to P[N] to zero for the N identified translation record files 11 (S25). The count values P[1] to P[N] indicate the respective quantities of translation record keys identical with the input keys for each of the translation record files 11. The count values P[1] to P[N] can be, for example, incremented by 1 when a plurality of translation record keys are identical with a single input key in a single translation record file 11. The first key generation unit 23 then substitutes 1 into a variable X (S26). The first key generation unit 23 then substitutes 1 into a variable W (S27). The first key generation unit 23 then generates an input key for a W-th translation segment in the source text (S31). The first key generation unit 23 then generates type information for the generated input key (S32).

The key search unit 26 refers to an X-th translation record key table 12 in the N translation record key tables 12 and extracts a translation record key that has type information matching type information of each of the input keys (S33). The key search unit 26 detects whether a translation record key that is identical with each of the input keys is present or not in the translation record keys extracted in step S33 (S34).

The key search unit 26 determines whether the translation record key identical with the input key is detected in step S34 (S35). When the identical translation record key is detected (YES in step S35), the first count unit 27 increments the count value of the X-th translation record file 11 by 1 by substituting (1+P[X]) into P[X] (S36). When the identical translation record key is not detected (NO in step S35) or when processing of step S36 is completed, the key search unit 26 determines whether processing for the last translation segment of the source text is completed (S37). When the processing for the last translation segment of the source text is not completed (NO in step S37), (W+1) is substituted into the variable W (S38), and the processing returns to step S31. This can detect a translation record key that is identical with an input key in the next translation segment of the source text.

When, in step S37, the processing for the last translation segment of the source text is completed (YES in step S37), the translation support apparatus 10 exits from loop processing of steps S31 to S37. Through the processing of steps S31 to S37, the translation support apparatus 10 can calculate the count value P[X] for the X-th translation record file 11.

When the processing for the last translation segment of the source text is completed (YES in step S37), it is determined whether the variable X is equal to or larger than N (S41). When the variable X is smaller than N (NO in step S41), (X+1) is substituted into the variable X (S42), the processing returns to step S27. The translation support apparatus 10 can obtain the count values P[1] to P[N], which are values calculated by accumulating the numbers of hits in which the translation segments of the source text match the translation record files 11 for each of the translation record files 11 by repeating the loop processing of steps S27 to S42.

When the processing for the last translation record file 11 is completed (YES in step S41), the first count unit 27 outputs the count values P[1] to P[N] for the N identified translation record files 11 to the determination unit 28 (S43). Through the processing of steps S21 to S43, the first count unit 27 can output to the determination unit 28 the count values P[1] to P[N] which indicate the respective quantities of translation record keys identical with the input keys in association with the respective translation record files 11.

Figure 7:
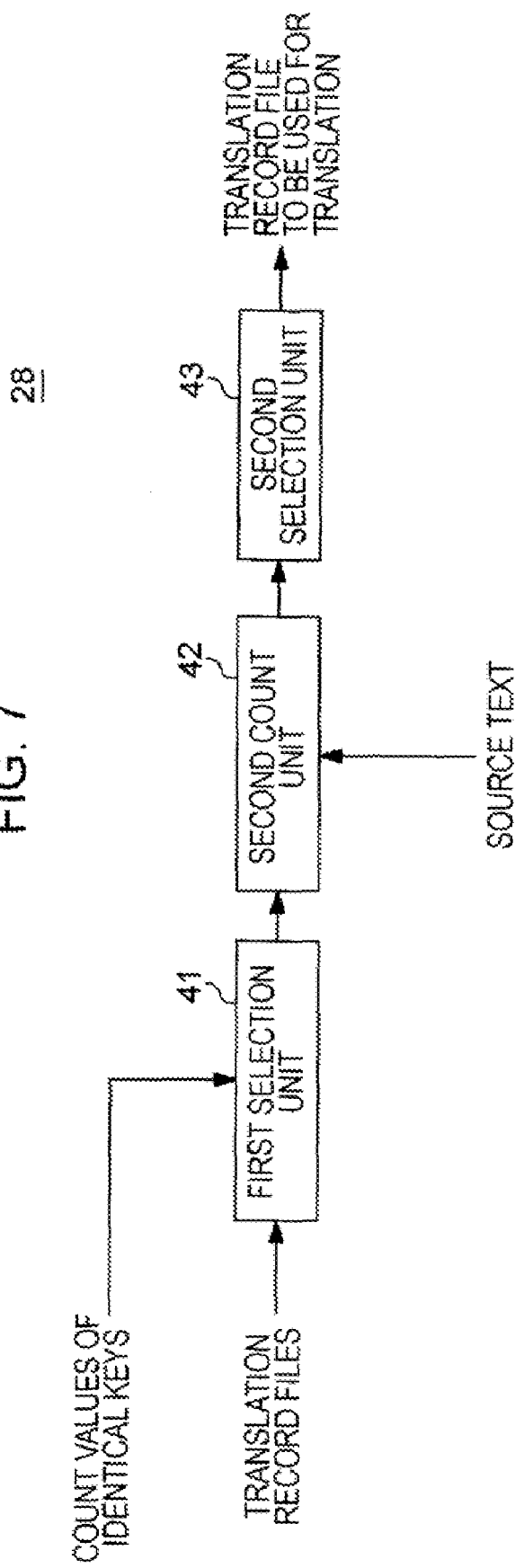
FIG. 7 illustrates the structure of a determination unit 28 according to an embodiment of the invention.

FIG. 7 illustrates the structure of the determination unit 28 according to the embodiment. One example is that the determination unit 28 can include a first selection unit 41, a second count unit 42, and a second selection unit 43. The first selection unit 41 selects a predetermined number of translation record files 11 in decreasing order of proportion of the quantity of input keys that have translation record keys identical therewith. The first selection unit 41 can, for example, calculate a hit rate which is the proportion of the count value P to the quantity of the translation segments of each of the plurality of translation record files 11 and select a predetermined number of top hit rates among the hit rates. The first selection unit 41 may, for example, assign the hit rate for each of the plurality of translation record files 11 as the proportion of the count value P to the quantity of translation segments contained in the source text. The first selection unit 41 may select a predetermined number of top numbers of hits in place of the hit rates. The first selection unit 41 reads the translation record files 11 corresponding to the selected hit rates from the storage unit 21 and outputs them to the second count unit 42.

The second count unit 42 counts the quantity of translation segments in the translation record file 11 storing the source-language text identical with or similar to the translation segments in the received source text for each of the translation record files 11 selected by the first selection unit 41. One example is that the second count unit 42 counts the number of perfect matching or generates a syntactic tree for the translation segments and counts the quantity of nodes identical with or similar to each other in the syntactic tree. The second selection unit 43 selects a translation record file 11 to be used in translation of the received source text on the basis of the count result of the second count unit 42. The second selection unit 43 outputs the selected translation record file 11 to the translation unit 29.

Figure 8:
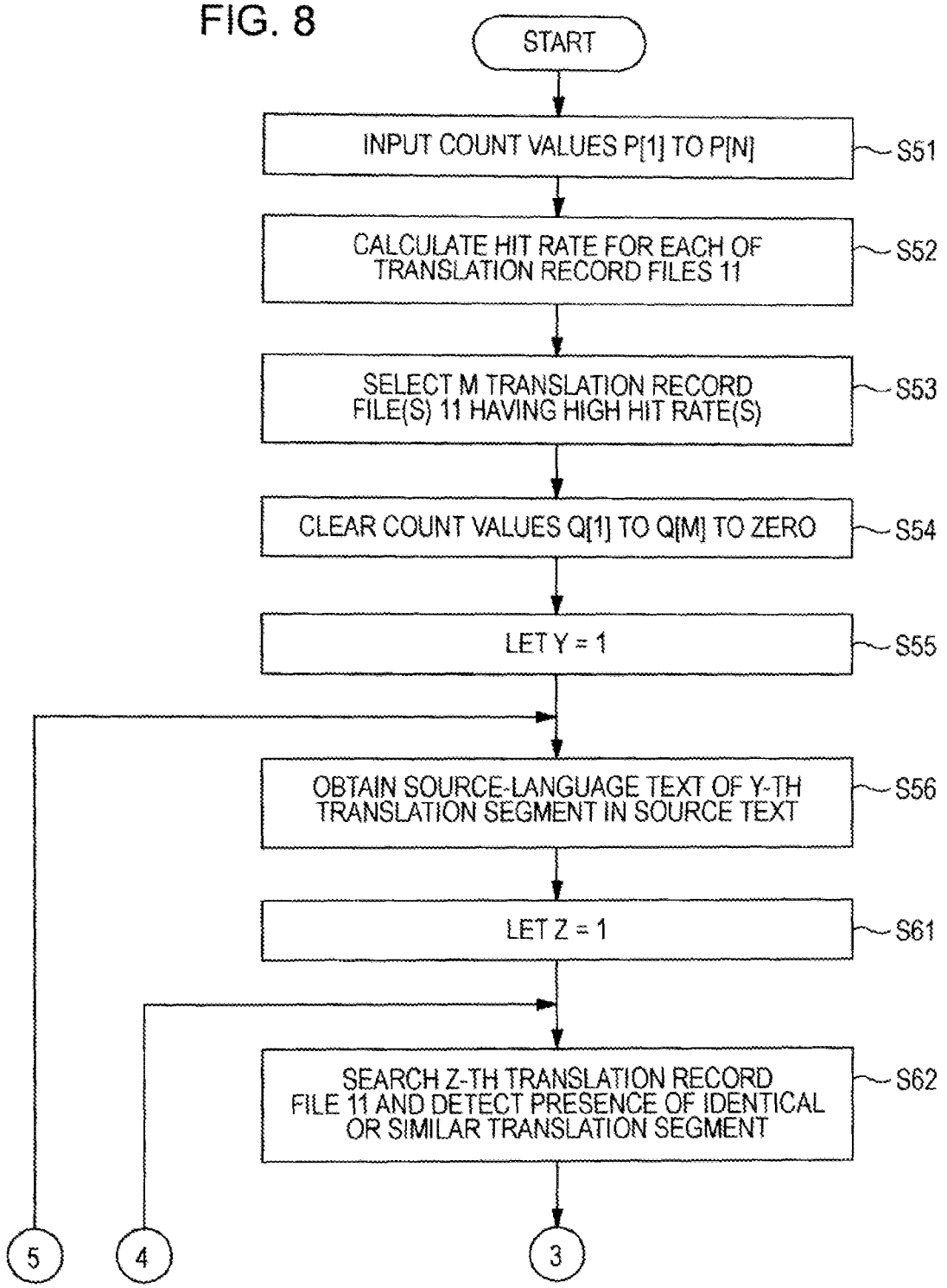
FIGS. 8 and 9 illustrate flow diagrams of an operation of the determination unit 28 according to the preferred embodiment.
Figure 9:
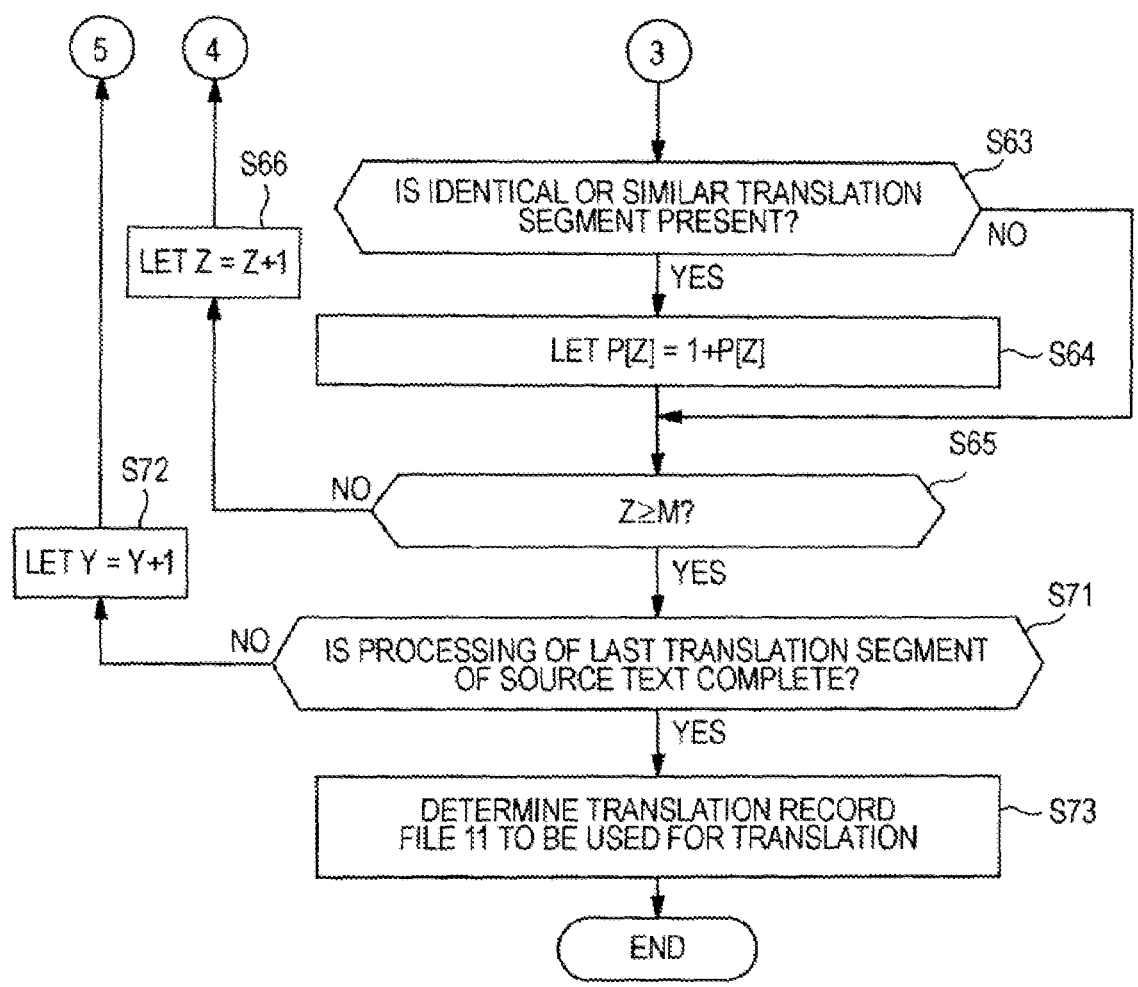

FIGS. 8 and 9 illustrate flow diagrams of an operation of the determination unit 28 according to the embodiment. The first selection unit 41 receives the count values P[1] to P[N] (S51). The first selection unit 41 counts the hit rate for each of the corresponding N translation record files 11 on the basis of the count values P[1] to P[N] (S52). The first selection unit 41 selects M translation record file(s) 11 having high hit rates among the N translation record files 11 (S53). M is an integer smaller than N and equal to or greater than 1. In step S53, the first selection unit 41 may select a translation record file 11 having a hit rate that is equal to or greater than a predetermined threshold value. Alternatively, the first selection unit 41 may select a translation record file 11 having the number of hits that is equal to or greater than a predetermined threshold value in place of the hit rate.

The second count unit 42 clears count values Q[1] to Q[M] of the M selected translation record file(s) 11 to zero (S54). The count values Q[1] to Q[M] indicate the respective quantities of translation segments identical with the source text for the translation record files 11. The second count unit 42 substitutes 1 into a variable Y (S55). The second count unit 42 acquires a Y-th source-language text being a divided part corresponding to one of translation segments in the source text (S56).

The second count unit 42 substitutes 1 into a variable Z (S61). The second count unit 42 then searches a Z-th translation record file 11 among the M translation record file(s) 11 and detects whether a translation segment identical with or similar to the Y-th translation segment in the source text is present or not (S62). In other words, in step S62, the second count unit 42 detects a translation segment identical with the Y-th translation segment or a translation segment having a degree of identity that allows being used for translation of the Y-th translation segment from the Z-th translation record file 11.

The second count unit 42 determines whether the identical or similar translation segment is detected in step S62 (S63) When the identical or similar translation segment is detected (YES in step S63), the second count unit 42 increments the count value for the Z-th translation record file 11 by 1 by substituting (1+Q[Z]) into Q[Z] (S64). When the identical or similar translation segment is not detected (NO in step S63) or when processing of step S64 is completed, the second count unit 42 determines whether the variable Z is equal to or greater than M (S65). When the variable Z is smaller than M (NO in step S65), (Z+1) is substituted into the variable Z (S66), and the processing returns to step S62.

When, in step S65, the variable Z is equal to or greater than M (YES in step S65), the determination unit 28 exits from loop processing of steps S62 to S66. Through the processing of steps S62 to S66, the determination unit 28 can increment by 1 the count value for a translation record file 11 that has a translation segment identical with or similar to the Y-th translation segment of the source text.

The second count unit 42 determines whether processing for the last translation segment of the source text is completed (S71). When the processing for the last translation segment is not completed (NO in step S71), (Y+1) is substituted into the variable Y (S72), and the processing returns to step S56.

When the processing for the last translation segment is completed (YES in step S72), the second count unit 42 selects a translation record file 11 to be used for translation of the source text on the basis of the count values Q[1] to Q[M] for the M selected translation record file(s) 11 (S73). For example, the second count unit 42 can select a translation record file 11 having a large count value. The second selection unit 43 outputs the selected translation record file 11 to the translation unit 29. Through the processing of steps S51 to S73, the determination unit 28 can determine a translation record file 11 utilizable for translation and provide it to the translation unit 29.

The translation support apparatus 10 narrows a plurality of translation record files 11 analogous to the source text from a large number of translation record files 11 by using input keys and translation record keys, directly compares the source-language texts being divided parts corresponding to translation segments, and extracts a translation record file 11 utilizable for translation. Since the translation support apparatus 10 first performs a broad search and then performs a detailed search, an appropriate translation record file 11 can be determined at high speed.

Figure 10:
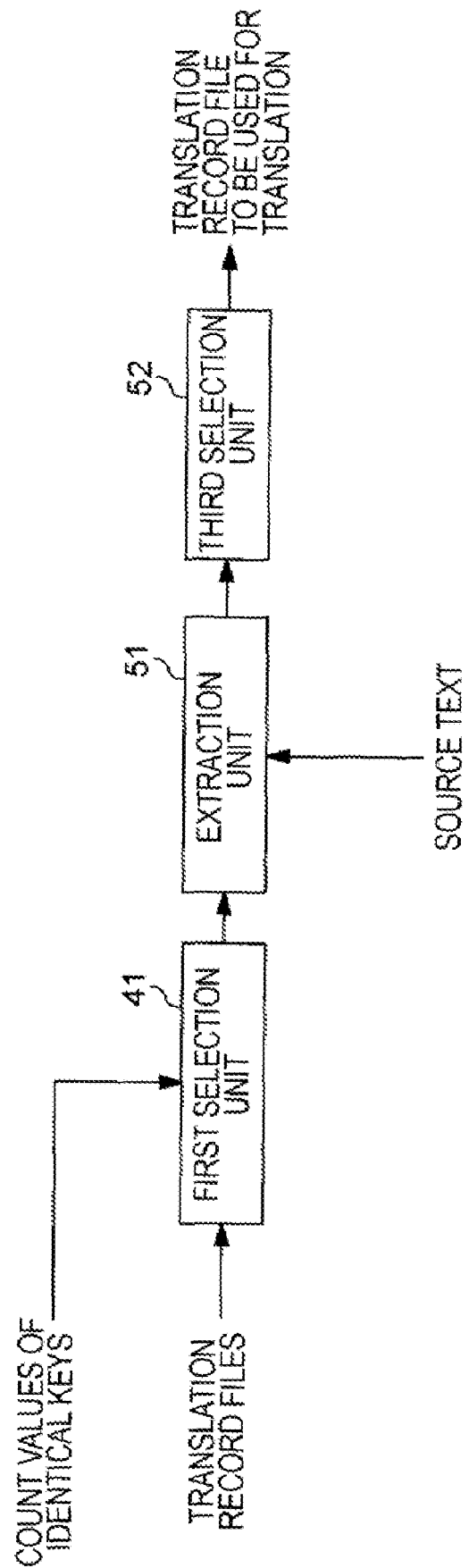
FIG. 10 illustrates the structure of the determination unit 28 according to a variation of the preferred embodiment.

FIG. 10 illustrates the structure of the determination unit 28 according to a modification of the embodiment. The modification has substantially the same structure as in the embodiment. Therefore, in FIG. 10, the same reference numerals are used as in FIG. 7 for elements having substantially the same functions as in FIG. 7, and the description of the elements is omitted except for differences between the embodiment and the modification described below.

The determination unit 28 according to the modification includes the first selection unit 41, an extraction unit 51, and a third selection unit 52.

The extraction unit 51 extracts a translation segment storing a source-language text identical with or similar to each of the translation segments of the received source text from the translation record file 11 selected from the first selection unit 41 and generates a new translation record file 11. The third selection unit 52 selects the new translation record file 11 generated by the extraction unit 51 as a translation record file 11 to be added to the plurality of translation record files 11 for use in subsequent translation.

Figure 11:
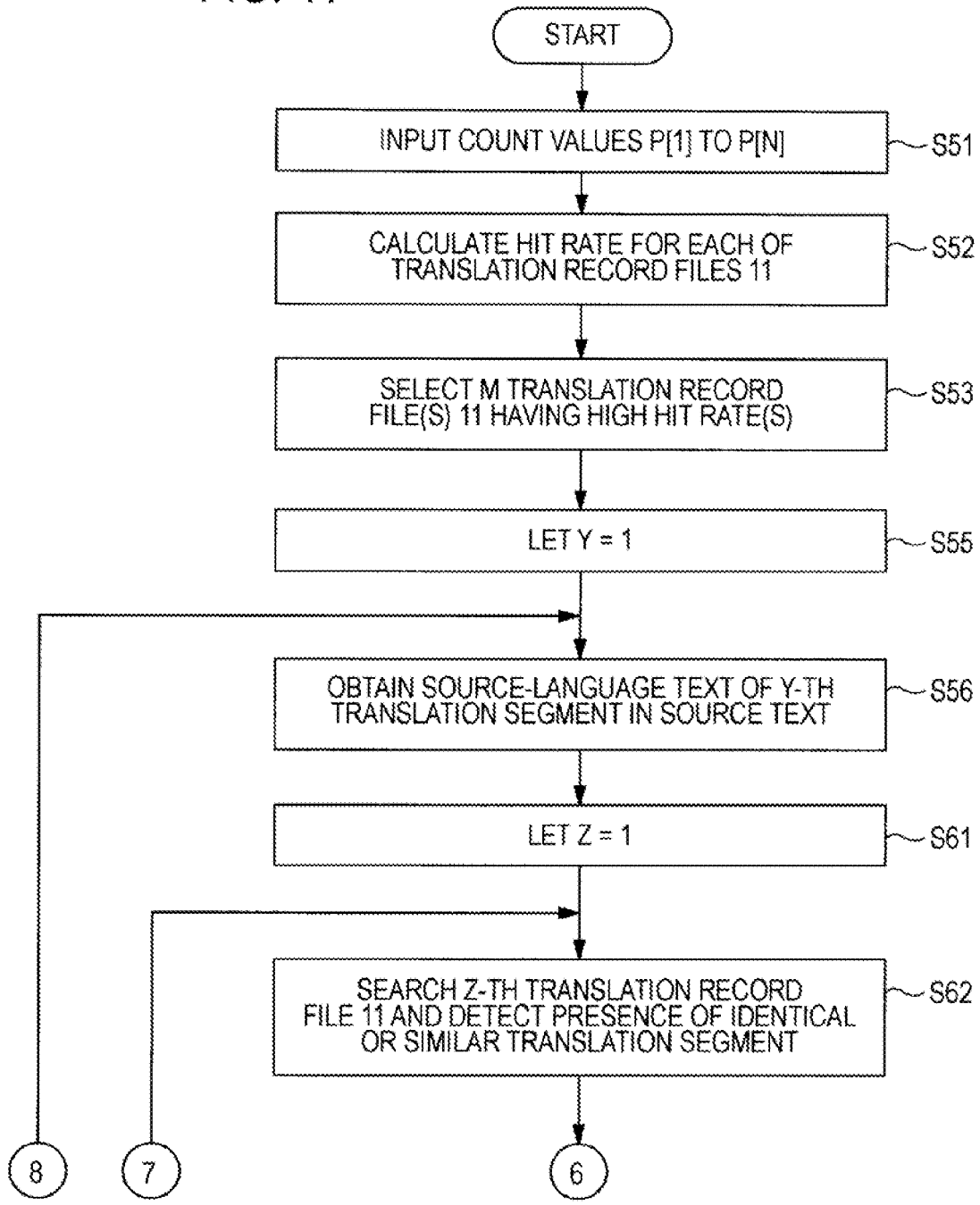
FIGS. 11 and 12 illustrate flow diagrams of an operation of the determination unit 28 according to the variation of FIG. 10.
Figure 12:
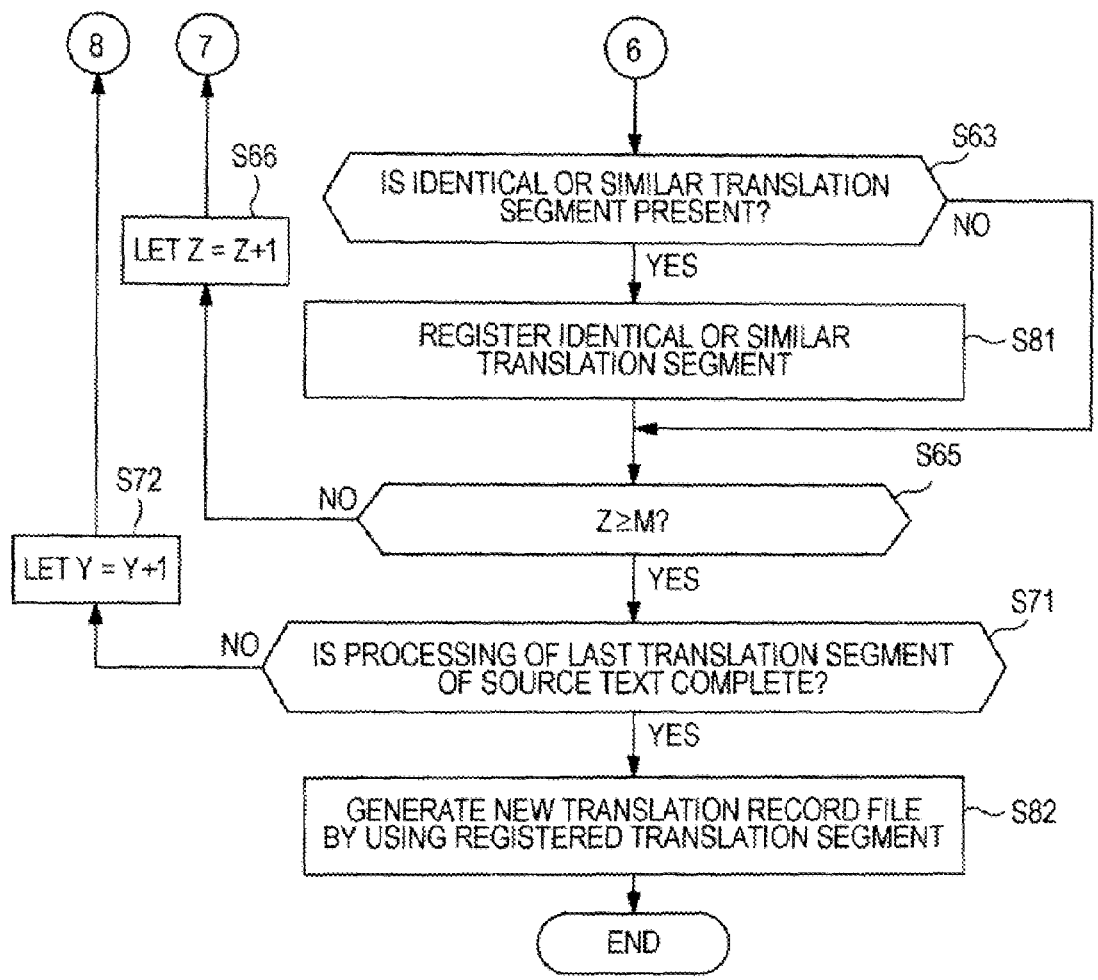

FIGS. 11 and 12 illustrate flow diagrams of an operation of the determination unit 28 according to the modification. The operational flow diagrams of the determination unit 28 according to the modification are substantially the same as the flow diagrams illustrated in FIGS. 8 and 9 except for the following points. Therefore, the description of the operational flow diagrams of the determination unit 28 according to the modification is omitted except for steps S81 and S82.

In step S81, when the identical or similar translation segment is detected (YES in step S63), the third selection unit 52 registers in, for example, an internal memory the source-language text and the target-language text for each detected translation segment. In step S82, the third selection unit 52 generates a new translation record file 11 by using the registered source-language text and the target-language text for each of the translation segments and outputs the generated translation record file 11 to the translation unit 29 as a translation record file 11 for use in translation. According to the modification, even when texts identical with or similar to the source text being a translation target are distributed among a plurality of translation record files 11, the texts can be gathered into a single translation record file 11 and used.

Figure 13:
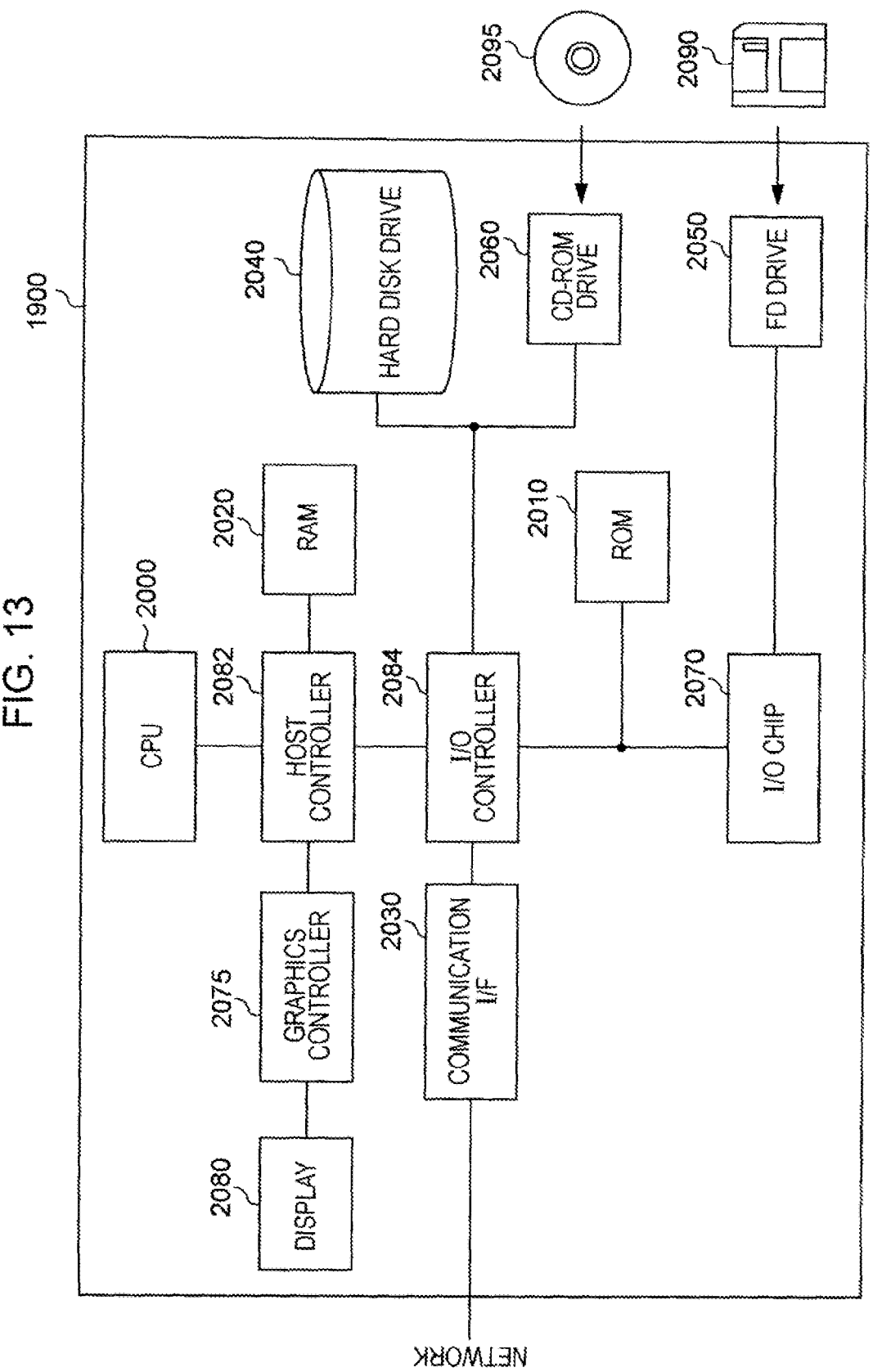
FIG. 13 illustrates an example of hardware configuration of a computer 1900 suitable for practicing the present invention.

FIG. 13 illustrates an example of hardware configuration of a computer 1900 according to an embodiment of the present invention. The computer 1900 includes a central processing unit (CPU) peripheral portion, an input/output portion, and a legacy input/output portion. The CPU peripheral portion includes a CPU 2000, a random-access memory (RAM) 2020, a graphics controller 2075, and a display 2080, which are interconnected to one another through a host controller 2082. The input/output portion includes a communication interface 2030, a hard disk drive 2040, and a compact disk read-only memory (CD-ROM) drive 2060, which are connected to the host controller 2082 through an input/output controller 2084. The legacy input/output portion includes a ROM 2010, a flexible disk drive 2050, and an input/output chip 2070, which are connected to the input/output controller 2084.

The host controller 2082 connects the RAM 2020 to the CPU 2000 and the graphics controller 2075 which access to the RAM 2020 at high transfer rates. The CPU 2000 operates on the basis of a program stored in the ROM 2010 and the RAM 2020 and controls each unit. The graphics controller 2075 obtains image data created on a frame buffer within the RAM 2020 by the CPU 2000 and the like and displays the image data on the display 2080. Instead of this, the graphics controller 2075 may include a frame buffer storing image data created by the CPU 2000 and the like therein.

The input/output controller 2084 connects the host controller 2082 to the communication interface 2030, the hard disk drive 2040, and the CD-ROM drive 2060, which are input/output devices operating at relatively high speed. The communication interface 2030 communicates with other devices over a network. The hard disk drive 2040 stores a program and data used by the CPU 2000 of the computer 1900. The CD-ROM drive 2060 reads a program or data from a CD-ROM 2095 and provides it to the hard disk drive 2040 through the RAM 2020.

The input/output controller 2084 are connected to the ROM 2010, the flexible disk drive 2050, and the input/output chip 2070, which are input/output devices operating at relatively low speed. The ROM 2010 stores a boot program executed by the computer 1900 on starting and a program dependent on hardware of the computer 1900. The flexible disk drive 2050 reads a program or data from a flexible disk 2090 and provides it to the hard disk drive 2040 through the RAM 2020. The input/output chip 2070 connects various input/output devices through the flexible disk drive 2050 and other ports, such as a parallel port, a serial port, a keyboard port, and a mouse port.

A program to be provided to the hard disk drive 2040 through the RAM 2020 is provided by a user via a recording medium, such as the flexible disk 2090, the CD-ROM 2095, or an IC card, storing the program. The program is read from the recording medium, is installed in the hard disk drive 2040 of the computer 1900 through the RAM 2020, and is executed in the CPU 2000.

A program installed in the computer 1900 and causing the computer 1900 to function as the translation support apparatus 10 includes a storage module functioning as the storage unit 21, an input module functioning as the input unit 22, a fist key generation module functioning as the first key generation unit 23, a second key generation module functioning as the second key generation unit 24, an acquisition module functioning as the acquisition unit 25, a key search module functioning as the key search unit 26, a first count module functioning as the first count unit 27, a determination module functioning as the determination unit 28, a translation module functioning as the translation unit 29, and an output module functioning as the output unit 30. The program and/or the modules encourage the CPU 2000 to make the computer 1900 function as the storage unit 21, the input unit 22, the first key generation unit 23, the second key generation unit 24, the acquisition unit 25, the key search unit 26, the first count unit 27, the determination unit 28, the translation unit 29, and the output unit 30.

The program and/or the modules described above may be stored in an external storage medium. Examples of the storage medium include, in addition to the flexible disk 2090 and the CD-ROM 2095, an optic recording medium, such as a DVD and CD, a magneto-optical disk, such as an MO, a tape medium, and a semiconductor memory, such as an IC card. By using a storage device such as a hard disk or a RAM provided in a server system connected to a private communication network or the Internet as the recording medium, the program may be provided to the computer 1900 over a network.

While the present invention has been described with reference to embodiments, it is to be understood that the technical scope of the present invention is not limited to the disclosed exemplary embodiments. It is obvious to one of ordinary skill in the art that various modifications and improvements may be applied to the embodiments. It is obvious from the claims that arrangements to such modifications or improvements are applied can be included in the technical scope of the present invention.

We claim:

1. A method for providing a translation support service by using an apparatus for selecting from a translation record for use in translation of a newly received text among a plurality of translation records, each of the translation records storing with respect to past translation results at least one pair of a source-language text, being a divided part corresponding to a translation segment in a received unit, being units of translation of text, and a target-language text corresponding to the source-language text, the method comprising:

a first key generation step of, with respect to each of the translation segments in the received text, generating an input key in which the source-language text, being a divided part corresponding to one of the translation segments, is encoded based on a predetermined conversion rule by a first key generation unit in a computer;

an acquisition step of, in association with each of the plurality of translation records, acquiring a translation record key in which the source-language text, being the divided part corresponding to one of the translation segments in the translation record, is encoded based on the predetermined conversion rule by an acquisition unit in the computer;

a key search step of searching whether the translation record key identical to each of the input keys is present by a key search unit in the computer, with respect to each of the translation records;

a first count step of counting the quantity of input keys that have translation record keys identical therewith by a first count unit realized by the computer, with respect to each of the translation records; and a determination step of determining the translation record for use in translation of the received text by a determination unit realized by the computer, on the basis of a count result with respect to each of the translation records;

wherein the input key generated by first key generation step comprises a character string in which a determined number of characters is selected from the leading end of each word contained in a source-language text, being a divided part corresponding to one of translation segments in the received text, and concatenated, and wherein the translation record key generated by the acquisition step, in association with each of the translation records, comprises a character string in which a determined number of characters is selected from the leading end of each word contained in the source-language text, being a divided part corresponding to one of the translation segments in the translation record, and concatenated.

2. A method for providing a translation support service by using an apparatus for selecting from a translation record for use in translation of a newly received text among a plurality of translation records, each of the translation records storing with respect to past translation results at least one pair of a source-language text, being a divided part corresponding to a translation segment in a received unit, being units of translation of text, and a target-language text corresponding to the source-language text, the method comprising:

a first key generation step of, with respect to each of the translation segments in the received text, generating an input key in which the source-language text, being a divided part corresponding to one of the translation segments, is encoded based on a predetermined conversion rule;

an acquisition step of, in association with each of the plurality of translation records, acquiring a translation record key in which the source-language text, being the divided part corresponding to one of the translation segments in the translation record, is encoded based on the predetermined conversion rule;

a key search step of searching whether the translation record key identical with each of the input keys is present or not with respect to each of the translation records;

first count step of counting the quantity of input keys that have translation record keys identical therewith with respect to each of the translation records; and a determination step of determining the translation record for use in translation of the received text, on the basis of a count result with respect to each of the translation records;

wherein the input key generated by first key generation step comprises a character string in which a determined number of characters is selected from the leading end of each word contained in a source-language text, being a divided part corresponding to one of translation segments in the received text, and concatenated, and wherein the translation record key generated by the acquisition step, in association with each of the translation records, comprises a character string in which a determined number of characters is selected from the leading end of each word contained in the source-language text, being a divided part corresponding to one of the translation segments in the translation record, and concatenated.

3. A method for selecting a translation record for use in translation of a newly received text from among a plurality of translation records, each of the plurality of translation records storing with respect to past translation results, at least one pair of a source-language text being a divided part corresponding to a translation segment in the received text being units of translation of text and a target-language text corresponding to the source-language text for a past translation result, the method comprising:

a storing step of storing as one of the plurality of translation records where a pair of the source-language text and the target-language text obtained by translating the source-language text, with respect to each of the translation segments, by a storing unit realized by a computer;

a first key generation step of, with respect to each of the translation segments in the received text, generating an input key in which the source-language text being the divided part corresponding to one of the translation segments is encoded based on a predetermined conversion rule by a first key generation unit realized by the computer;

an acquisition step of, in association with each of the plurality of translation records, acquiring a translation record key in which the source-language text being the divided part corresponding to one of the translation segments in the translation record is encoded based on the predetermined conversion rule by an acquisition unit realized by the computer;

a key search step of searching whether a translation record key identical with each of the input keys is present or not, with respect to each of the plurality of translation records, by a key search unit realized by the computer;

a first count step of counting the quantity of input keys that have translation record keys identical therewith with respect to each of the plurality of translation records, by a first count unit realized by the computer;

a determination step of determining the translation record for use in translation of the received text on the basis of a count result with respect to each of the plurality of translation records by a determination unit realized by the computer; and a translating step of translating the received text by using the determined translation record by a translation unit realized by the computer;

wherein the input key generated by first key generation step comprises a character string in which a determined number of characters is selected from the leading end of each word contained in a source-language text, being a divided part corresponding to one of translation segments in the received text, and concatenated, and wherein the translation record key generated by the acquisition step, in association with each of the translation records, comprises a character string in which a determined number of characters is selected from the leading end of each word contained in the source-language text, being a divided part corresponding to one of the translation segments in the translation record, and concatenated.

* * * * *